United States Patent
Park et al.

(10) Patent No.: US 6,517,806 B2
(45) Date of Patent: Feb. 11, 2003

(54) CDZNMS PHOTOCATALYST INCLUDING CATIONS FOR WATER DECOMPOSITION AND PREPARATION THEREOF AND METHOD FOR PRODUCING HYDROGEN BY USE OF THE SAME

(75) Inventors: Dae-Chul Park, Daejon (KR); Jin-Ook Baeg, Daejon (KR)

(73) Assignees: Korea Research Institute of Chemical Technology, Daejon (KR); Chonggu Co., Ltd., Daegu (KR)

( * ) Notice: Subject to any disclaimer, the term of this patent is extended or adjusted under 35 U.S.C. 154(b) by 123 days.

(21) Appl. No.: 09/735,605

(22) Filed: Dec. 14, 2000

(65) Prior Publication Data
US 2002/0045538 A1 Apr. 18, 2002

(30) Foreign Application Priority Data
Feb. 22, 2000 (KR) .............................. 00-8555

(51) Int. Cl.$^7$ .............................. C01B 3/08; B01J 23/00
(52) U.S. Cl. .................... 423/657; 502/306; 502/307; 502/324; 502/326; 502/328; 502/329; 502/345; 502/347; 502/349; 502/353; 502/355
(58) Field of Search .................... 423/657; 502/306, 502/307, 324, 326, 328, 329, 345, 347, 349, 353, 355

(56) References Cited

U.S. PATENT DOCUMENTS 6,077,497 A * 6/2000 Park et al. ............... 423/648.1
6,297,190 B1 * 10/2001 Park et al. ............. 204/157.52
6,300,274 B1 * 10/2001 Park et al. ............. 204/157.52

FOREIGN PATENT DOCUMENTS

JP          54033034 A * 3/1979 ............ G03G/5/08

* cited by examiner

Primary Examiner—Stanley S. Silverman
Assistant Examiner—Maribel Medina
(74) Attorney, Agent, or Firm—Jacobson Holman PLLC

(57) ABSTRACT

Present invention relates to a CdZnMS photocatalyst for producing hydrogen from water and a method for preparing thereof and a method for producing hydrogen by using said photocatalyst. Said photocatalyst is characterized by the following general formula VII:

$$m(a)/Cd_xZn_yM_zS \quad\quad (VII)$$

wherein 'm' represents at least one doped metal element as an electron acceptor selected from the group consisting of Ni, Pt, Ru and the oxidized compound of these metals; 'a' represents a % by weight of m, ranging from 0.10 to 5.00; 'M' is a catalyst element selected from the group consisting of Mo, V, Al, Cs, Mn, Fe, Pd, Pt, P, Cu, Ag, Ir, Sb, Pb, Ga and Re. 'z' represents an atom % of M/(Cd+Zn+M), ranging from 0.05 to 20.00 and 'x' and 'y' represent an atom % of Cd/(Cd+Zn+M) and an atom % of Zn/(Cd+Zn+M), ranging from 10.00 to 90.00, respectively.

8 Claims, No Drawings

CDZNMS PHOTOCATALYST INCLUDING CATIONS FOR WATER DECOMPOSITION AND PREPARATION THEREOF AND METHOD FOR PRODUCING HYDROGEN BY USE OF THE SAME

TECHNICAL FIELD

The present invention relates to a photocatalyst for hydrogen production and preparation thereof and a method for producing hydrogen by use of the same, more particularly, to a photoreaction in which hydrogen can be efficiently and economically produced from water in the presence of a CdZnMS photocatalyst according to the present invention.

BACKGROUND ART

Hydrogen is generally used to produce ammonia and methanol and is applied to produce saturated compounds as an essential element. Also, it plays a pivotal role in hydrotreating processes, including hydrogen addition, desulfurization, denitrogenation, demetallization and especially the hydrogenation of carbon dioxide, which causes global warming. Furthermore, hydrogen is viewed as a pollution-free energy source and a substitute for existing fossil fuels.

There are many different kinds of conventional methods for producing hydrogen, which include extraction from fossil fuels, such as naphtha, modification of natural gas, a reaction of vapor with iron at a high temperature, a reaction of water with alkaline metal, and an electrolysis of water, etc.

However, these techniques are economically unfavorable because immense heat or electric energy is required and, particularly, in the modification of fossil fuels, a large quantity of carbon dioxide is generated as a by-product. For an electrolysis of water, problems including a short electrode lifetime and a by-product generated such as an oxygen should be solved. Thus, it has heretofore been economically unfavorable to solve these problems due to the huge cost for a hydrogen production facility.

Hydrogen gas can readily escape from the gravity of the earth because it is of low specific gravity, and most of it exists in water or inorganic forms. For these reasons, only a small amount of hydrogen exists in the atmosphere. It is also very difficult to purify hydrogen existing in an inorganic form. Even though hydrogen purification is practically possible, it is also economically unfavorable. Therefore, the development of technique for a high-purity hydrogen from water is very important for solving the urgent problem of exploiting substitute energy sources.

Recently, hydrogen producing techniques in which a photocatalyst is used to decompose water into hydrogen and oxygen have been developed. However, there is little published prior art relating to photocatalysts for producing hydrogen. Representative prior art is exemplified by Japanese Pat. Laid-Open Publication Nos. Sho 62-191045 and Sho 63-107815 and applications of present inventors as below.

Japanese Pat. Laid-Open Publication No. Sho 62-191045 shows that hydrogen is generated from a photolysis reaction of an aqueous $Na_2S$ solution in the presence of a rare-earth element compound. Also, the rare-earth element compound as a catalyst has an advantage of exhibiting an optical activity in the range of the visible light.

Japanese pat. Laid-Open Publication No. Sho 63-107815 describes a photolysis reaction in which a composite oxide of niobium and alkali earth metal is used as a photocatalyst to generate hydrogen from a methanol solution in water. Likely, this photocatalyst has an advantage of being optically active in a visible light.

However, the noted prior art is disadvantageous in that the amount of hydrogen generated is so small and the rate of hydrogen production is only 10 mL/0.5 g hr.

There are also Korean Pat. Appl'n. No.95-7721, No.95-30416 and No.96-44214, which are able to solve the above problems.

Korean Pat. Appl'n No. 95-7721 suggests a photocatalyst represented by the following general formula I:

$$Cs(a)/K_4Nb_6O_{17} \qquad \qquad I$$

In the presence of the photocatalyst of formula I, this technique has little affect on the environment and can generate hydrogen at room temperature. However, the oxygen-containing organic compounds acting as a hydrogen-generating promoter to produce hydrogen make an interruption to reuse the reactants.

Korean Pat. Appl'n No.95-30416 suggests a photocatalyst represented by the following formula II:

$$Cs(a)M(c)/S(b) \qquad \qquad II$$

This technique also has little affect on the environment and can generate hydrogen without an oxygen-containing organic compound acting as a hydrogen-generating promoter at room temperature but has some problems with the lifetime and stability of said photocatalyst of formula II. For example, when alkali metal, such as cesium (Cs), is impregnated in a photo-carrier, the amount of hydrogen generated is outstandingly increased but the catalyst stability is decreased.

Korean Pat. Appl'n No. 96-44214 describes a photocatalyst represented by the following formula III:

$$Pt(a)/Zn[M(b)]S \qquad \qquad III$$

This technique likewise has little affect on the environment. Although depending on electron donors and reducing agents, the photocatalyst of formula III is superior in simplicity of preparation, stability, and lifetime, as well as optical activity in the range of visible light, compared with previously-noted prior arts. But the amount of produced hydrogen is still economically unfavorable.

Korean Pat. Application No. 98-37179 suggests a photocatalyst represented by the following formula IV:

$$Pt(a)/Zn[M(b)]S \qquad \qquad IV$$

This technique also has little affect on the environment and the said photocatalyst of formula IV has an optical activity in some degree in the range of visible light. The preparation of the said photocatalyst is much simpler and by-products are much less produced. However, the amount of generated hydrogen is still not enough economically.

To solve the above mentioned problems, Korean Pat. Application 98-37180 by present inventors suggests a photocatalyst represented by the following formula V:

$$m(A)/Cd[M(B)]S \qquad \qquad V$$

The said photocatalyst of formula V shows an optical activity in the range of visible light adjusted by light filter as well as in the sunlight. The amount of generated hydrogen is much larger and the lifetime of the said photocatalyst is semi-infinitive. By introducing various doping metals and promoters and other new methods, said prior art overcomes the restricted activity in the light sources and suggests more simple method of preparation. Likewise, the lifetime of photocatalyst is also longer and the amount of generated hydrogen from water is remarkably larger than that of prior art. However, this technique shows limited hydrogen activity only to one reducing agent.

To solve the above mentioned problems economically, Korean Pat. Application 99-22954 by present inventors suggests a photocatalyst represented by the following formula VI:

$$m(a)/Cd[M(b)]S \qquad\qquad VI$$

In this prior art, the technique relates to novel CdS photocatalyst (photocatalyst system), preparation thereof and construction of new reduction system with a sulfite to generate hydrogen economically. However, the rate of producing hydrogen is still not satisfied in the economic point of view.

DISCLOSURE OF THE INVENTION

Therefore, it is an object of the present invention to overcome the above problems encountered in prior arts and to provide a novel photocatalyst for producing hydrogen with an optical activity in both visible and uv lights.

It is another object of the present invention to provide a photocatalyst with high activity in a reductant and sunlight, with a high yield of hydrogen, and with an infinite lifetime.

It is further object of the present invention to provide a preparation method for photocatalyst with a high degree of photocatalytic activity.

BEST MODE FOR CARRYING OUT THE INVENTION

The photocatalyst of the present invention is characterized by the following general formula VII:

$$m(a)/Cd_xZn_yM_zS \qquad\qquad VII$$

wherein 'm' represents a doped metal element as an electron acceptor selected from the group consisting of Ni, Pt, Ru or the oxidized compound of these metals; 'a' represents a percentage by weight of m, ranging from 0.10 to 5.00; 'M' is at least one catalyst element selected from the group consisting of Mo, V, Al, Cs, Mn, Fe, Pd, Pt, P, Cu, Ag, Ir, Sb, Pb, Ga and Re. 'z' represents an atom % of M/(Cd+Zn+M), ranging from 0.05 to 20.00 and 'x' and 'y' represent an atom % of Cd/(Cd+Zn+M) and an atom % of Zn/(Cd+Zn+M), ranging from 10.00 to 90.00, respectively.

The preparation of photocatalyst in the present invention is characterized by the doping procedure as the following steps of: dissolving Cd-containing, Zn-containing and M-containing compounds in water in such an amount that the atom % of M ranging from 0.05 to 20.00 and the atom % of Cd/(Cd+Zn+M) and an atom % of Zn/(Cd+Zn+M), ranging from 10.00 to 90.00, respectively; adding $H_2S$ or $Na_2S$ as a reactant in the solution with stirring to precipitate CdZnMS; washing the precipitate with water and vacuum drying the precipitate in a nitrogen atmosphere; doping a liquid m-containing compound to this precipitate in such amount that the % by weight of m ranging from 0.10 to 5.00.

Likewise prior art of present inventors, hydrogen is produced by a method in which visible light adjusted by a light filter, sun light or uv light is irradiated onto a suspension of the said photocatalyst in water to which $Na_2S$ as an electron donor and $NaH_2PO_2$ or $NaH_2PO_2$ as a reductant have been added.

In detail, the present invention will be described as below.

Acting as an electron acceptor, the doping metal, m, in the formula VII is an element selected from the group consisting of Ni, Pt, Ru or an oxide thereof, and is used preferably at such an amount that the % by weight of m ranges approximately from 0.10 to 5.00. For example, if the amount of m ingredient is below 0.10% by weight, the amount of hydrogen generated is decreased and the stability of the said photocatalyst is also decreased. On the other hand, if the amount of m ingredient is over 5.00% by weight, the amount of hydrogen generated is decreased and the production cost is not economically favorable.

In the photocatalyst of the present invention, 'M' is selected from the group consisting of Mo, V, Al, Cs, Mn, Fe, Pd, Pt, P, Cu, Ag, Ir, Sb, Pb, Ga, Re and 'z' represents an atom % of M/(Cd+Zn+M), ranging from 0.05 to 20.00. If the value of B is less than the lower limit, the activity of photocatalyst will be lost. On the other hand, if the value of B is over the upper limit, the amount of generated hydrogen will be decreased.

As to the molar ratio of Cd to S and Zn to S, it is preferred that the molar ratio of Cd to S ranges from 1:0.05 to 1.4 and that of Zn to S ranges from 1:0.05 to 1:1.4, more preferably, from 1:0.3 to 1:0.7, respectively. Within said molar ratio ranges, the efficiency of photocatalyst of the present invention is increased.

In the preparation of said photocatalyst, if 'm' is platinum (Pt) as a doping element, it is preferable for Pt to be illuminated with uv in a nitrogen atmosphere and doped on the CdZnMS by sintering. More preferably, hydrogen hexachloroplatinate(IV) ($H_2PtCl_6$) is added to the CdZnMS precipitate and irradiated with uv light in a nitrogen atmosphere to impregnate the carrier at such an amount that the value of m(Pt) ranges from 0.10 to 5.00. The precipitate thus obtained is washed with water until the wash water pH reaches 7, vacuum-dried at 105 to 130° C. for 1.5 to 3.0 hours, oxidation-sintered at 300 to 400° C. for 1.0 to 6.0 hours and then reduction-sintered at 300 to 400° C. for 1.0 to 6.0 hours.

In case of other doping elements, the preferable preparation example of the photocatalyst comprises the steps of: adding an m-containing compound other than platinum to the CdZnMS precipitate obtained to reach the value of m ranging from 0.10 to 5.00; adding 6 or 7 drops of conc. hydrochloric acid with stirring; applying ultra sonication to the obtained slurry for 1.0 to 5.0 minutes; drying at 110 to 130° C. for 1.5 to 3.0 hours in vacuo; oxidation-sintering at 300 to 400° C. for 1.0 to 6.0 hours and then reduction-sintering at 300 to 400° C. for 1.0 to 6.0 hours, to yield the said photocatalyst.

In the preparation of photocatalyst doped with platinum, the reason why it is dried and sintered at oxidation/reduction state after the pH reaches 7 is to keep electron acceptor, Pt, in pure state. As well known, when Pt in $H_2PtCl_6$ is irradiated with uv, Pt activates the surface of CdZnMS and makes a bond with separated S to form PtS and therefore a Wurzite structure is obtained by sintering under oxidation and reduction states at a temperature of from 300 to 400° C. In case of sintering said product at a temperature of 300 to 400° C. for 1.0 to 6.0 hours, Pt as an electron acceptor can be transferred to pure state of Pt(0). More preferably, it should be sintered at a temperature of from 320 to 390° C. Beyond this temperature range, the lifetime and optical activity of said photocatalyst is decreased.

Examples of the Cd-containing compounds include $CdCl_2$, $CdBr_2$, $CdI_2$, $Cd(CH_3CO_2)_2$ $xH_2O$, $CdSO_4$ $xH_2O$, and $Cd(NO_3)_2 4H_2O$ and examples of the Zn-containing compounds include $ZnCl_2$, $ZnBr_2$, $ZnI_2$, $Zn(CH_3CO_2)_2$ $xH_2O$, $ZnSO_4$ $xH_2O$ and $Zn(NO_3)_2xH_2O$ and examples of the M-containing compounds include $MoCl_5$, $VCl_3$, $VOSO_4$, $VOCl_3$, $Al(NO_3)_3$, $AlCl_3$, $TiCl_4$, $Cs_2CO_3$, $Ti[OCH(CH_3)_2]_4$, $K_2Cr_2O_7$, $Cr(CH_3CO_2)_3$, $Cr(HCO_2)_3$, $Cr(NO_3)_3$, $H_3PO_2$, $NaH_2PO_2$, $SbCl_3$, $MnCl_3$, $MnF_3$, $KMnO_4$, $Pb(NO_3)_2$, $Pb(CH_3CO_2)_4$, $RuCl_3$, $FeCl_3$, $IrCl_3$, $Pd(NO_3)_2$, $H_2PtCl_6$, $Cu(NO_3)_2 3H_2O$, $AgNO_3$, $Ga(NO_3)_3$, $SnCl_2$, $ReCl_3$ etc.

And then also examples of the m-containing compounds include $H_2PtCl_6$, $RuCl_3$, $NiSO_4$, $Ni(NO_3)_2$, $Ni(CH_3CO_2)_2$, $NiCl_2$, $NiBr_2$, $NiI_2$ etc.

In Korean Pat. Appl'n No. 96-44214, prior art of present inventors, etching with acid is required after the primary sintering, but in this present invention, only the step of drying the precipitate in vacuo in a nitrogen atmosphere is needed, so the steps for the primary sintering and etching with acid are not needed in this preparation.

However, according to the present invention, hydrogen is produced by dissolving from 0.15 to 1.00 mol of $Na_2S$ as an electron donor and from 0.15 to 1.00 mol of $SO_3^{2-}$ instead of $H_2PO_2^-$ as a reductant in primary and/or secondary distilled water or in the previously treated water, and adding the photocatalyst of the present invention thereto. Then, the thus-obtained suspension is irradiated with visible light adjusted by a light filter or uv light with stirring at a temperature of from 5 to 85° C. at 0.1 atm. up to 5 atm. to yield hydrogen in a high degree of efficiency.

In addition, it is an important step to keep the concentration range of electron donor and reductant within the noted limits. If it is below the lower limit, the amount of hydrogen generated is decreased; if it is excess, the amount of hydrogen generated can not be increased further and the optimal reaction condition is at a temperature of from 10 to 60° C. in from a vacuum to 2 atm.

The photocatalyst of the present invention has a semi-infinite lifetime if the electron donor and reductant are added repeatedly to the reaction.

Preparation Examples according to the present invention are as below.

PREPARATION EXAMPLE I

Admix with 250 ml of water, $CdSO_4H_2O$ and $ZnSO_47H_2O$ $MoCl_5$ as a promotor and $H_2S$ as a reactant to have a same composition in Table 1 until a precipitate appears. Stir the resulting admixture wherein the precipitate is CdZnMoS. Wash this precipitate with wash water until the pH of the wash water reaches 7. Vacuum-dry the thus-washed precipitate in a nitrogen atmosphere at a temperature of 130° C. for 2 hours to yield a CdZnMoS powder.

To this powder, add $Ni(NO_3)_2$ $6H_2O$ to impart 1% by weight of Ni to the precipitate. Then slowly add 6 to 7 drops of conc. hydrochloric acid with stirring, followed by ultra sonication of the obtained product for 3 minutes, drying at a temperature of 130° C. for 2 hours, and finally oxidation sintering at a temperature of 380° C. for 4 hours and then reduction sintering at a temperature of 380° C. for 4 hours to yield a final Ni(1 wt. %)/$Cd_{49.70}Zn_{49.70}Mo_{0.6}S$ photocatalyst.

PREPARATION EXAMPLE II

Repeat the procedure of Preparation Example I with adding $MoCl_5$ to impart 1.0 atom % of Mo to the precipitate and thus yield a final Ni(1 wt. %)/$Cd_{49.50}Zn_{49.50}Mo_{1.0}S$ photocatalyst.

PREPARATION EXAMPLE III TO VII

Repeat the procedure of Preparation Example I with adding $MoCl_5$ to impart 2.0 atom % of Mo to the precipitate and thus yield a final Ni(1 wt. %)/$Cd_{49.00}Zn_{49.00}Mo_{2.0}S$ photocatalyst.

PREPARATION EXAMPLE VIII

Repeat the procedure of Preparation Example I, with adding $MoCl_5$ to impart 3.0 atom % of Mo to the precipitate and thus yield a final Ni(1 wt. %)/$Cd_{48.50}Zn_{48.50}Mo_{3.0}S$ photocatalyst.

PREPARATION EXAMPLE IX

Add $H_2PtCl_6$ to the powder $Cd_{49.70}Zn_{49.70}Mo_{2.0}S$ obtained in accordance with Preparation Example III, to impart 1.0% by weight of Pt to that powder. Illuminate the resulting precipitate with uv light (450 W, high pressure mercury lamp 4 cm from sample) in a nitrogen atmosphere for 0.5 hour; wash the thus illuminated precipitate with wash water until pH of the wash water reaches 7, subject the washed precipitate to drying at a temperature of 130° C. for 2 hours followed by oxidation sintering in air at a temperature of 380° C. for 4 hours and then reduction sintering at a temperature 380° C. for 4 hours to yield a final Pt(1 wt. %)/$Cd_{49.00}Zn_{49.00}Mo_{2.0}S$ photocatalyst.

PREPARATION EXAMPLE X

Repeat the procedure of Preparation Example I, except substitute $VCl_3$ for $MoCl_5$ and oxidation sintering at a temperature of 380° C. for 4 hours and thus yield a final Ni(1 wt %)/$Cd_{49.70}Zn_{49.70}V_{0.6}S$ photocatalyst.

PREPARATION EXAMPLE XI

Repeat the procedure of Preparation Example I, except add $VCl_3$ to impart 1.0 atom % of V to the precipitate and oxidation sintering at a temperature of 380° C. for 4 hours and thus yield a final Ni(1 wt. %)/$Cd_{49.50}Zn_{49.50}V_{1.0}S$ photocatalyst.

PREPARATION EXAMPLE XII

Repeat the procedure of Preparation Example I, except add $VCl_3$ to impart 2.0 atom % of V to the precipitate to yield a final Ni(1 wt. %)/$Cd_{49.00}Zn_{49.00}V_{2.0}S$ photocatalyst.

PREPARATION EXAMPLE XIII

Repeat the procedure of Preparation Example I, except add $VCl_3$ to impart 2.0 atom % of V to the precipitate and oxidation sintering at a temperature of 380° C. for 2 hours and thus yield a final Ni(1 wt. %)/$Cd_{49.00}Zn_{49.00}V_{2.0}S$ photocatalyst.

PREPARATION EXAMPLE XIV

Repeat the procedure of Preparation Example I, except add $VCl_3$ to impart 2.0 atom % of V to the precipitate and oxidation sintering at a temperature of 380° C. for 4 hours and thus yield a final Ni(1 wt. %)/$Cd_{49.00}Zn_{49.00}V_{2.0}S$ photocatalyst.

PREPARATION EXAMPLE XV

Repeat the procedure of Preparation Example I, except add $VCl_3$ to impart 2.0 atom % of V to the precipitate and oxidation sintering at a temperature of 380° C. for 6 hours and thus yield a final Ni(1 wt. %)/$Cd_{49.00}Zn_{49.00}V_{2.0}S$ photocatalyst.

PREPARATION EXAMPLE XVI

Repeat the procedure of Preparation Example XI, except add $VCl_3$ to impart 3.0 atom % of V to the precipitate and thus yield a final Ni(1 wt. %)/$Cd_{48.50}Zn_{48.50}V_{3.0}S$ photocatalyst.

PREPARATION EXAMPLE XVII

Repeat the procedure of Preparation Example XI, except add $VCl_3$ to impart 5.0 atom % of V to the precipitate and thus yield a final Ni(1 wt. %)/$Cd_{47.50}Zn_{47.50}V_{5.0}S$ photocatalyst.

PREPARATION EXAMPLE XVIII

Repeat the procedure of Preparation Example I, except substitute $Co(NO_3)_2$ for $MoCl_5$ and thus yield a final Ni(1 wt. %)/$Cd_{49.70}Zn_{49.70}Co_{0.6}S$ photocatalyst.

PREPARATION EXAMPLE XIX

Repeat the procedure of Preparation Example XVIII, except add $Co(NO_3)_2$ to impart 2.0 atom % of Co to the precipitate and thus yield a final Ni(wt. %)/$Cd_{49.00}Zn_{49.00}Co_{2.0}S$ photocatalyst.

PREPARATION EXAMPLE XX

Repeat the procedure of Preparation Example XIX, except add $Co(NO_3)_2$ to impart 5.0 atom % of Co to the precipitate and thus yield a final Ni(1 wt. %)/$Cd_{47.50}Zn_{47.50}Co_{5.0}S$ photocatalyst.

PREPARATION EXAMPLE XXI

Repeat the procedure of Preparation Example I, except substitute $Al(NO_3)_3$ for $MoCl_5$ and thus yield a final Ni(1 wt. %)/$Cd_{49.70}Zn_{49.70}Al_{0.6}S$ photocatalyst.

PREPARATION EXAMPLE XXII

Repeat the procedure of Preparation Example XIX, except add $Al(NO_3)_3$ to impart 2.0 atom % of Al to the precipitate and thus yield a final Ni(1 wt. %)/$Cd_{49.00}Zn_{49.00}Al_{2.0}S$ photocatalyst.

PREPARATION EXAMPLE XXIII

Repeat the procedure of Preparation Example XIX, except add $Al(NO_3)_3$ to impart 5.0 atom % of Al to the precipitate and thus yield a final Ni(1 wt. %)/$Cd_{47.50}Zn_{47.50}Al_{5.0}S$ photocatalyst.

PREPARATION EXAMPLE XXIV

Repeat the procedure of Preparation Example I, except substitute $Cs_2CO_3$ for $MoCl_5$ and thus yield a final Ni(1 wt. %)/$Cd_{49.70}Zn_{49.70}Cs_{0.6}S$ photocatalyst.

PREPARATION EXAMPLE XXV

Repeat the procedure of Preparation Example XXIV except add $Cs_2CO_3$ to impart 2.0 atom % of Cs to the precipitate and thus yield a final Ni(1 wt. %)/$Cd_{49.00}Zn_{49.00}Cs_{2..0}S$ photocatalyst.

PREPARATION EXAMPLE XXVI

Repeat the procedure of Preparation Example I, except substitute $Ti[OCH(CH_3)_2]_4$ for $MoCl_5$ and thus yield a final Ni(1 wt. %)/$Cd_{49.70}Zn_{49.70}Ti_{0.6}S$ photocatalyst.

PREPARATION EXAMPLE XXVII

Repeat the procedure of Preparation Example XXVI, except add $Ti[OCH(CH_3)_2]_4$ to impart 2.0 atom % of Ti to the precipitate and thus yield a final Ni(1 wt. %)/$Cd_{49.00}Zn_{49.00}Ti_{2.0}S$ photocatalyst.

PREPARATION EXAMPLE XXVIII

Repeat the procedure of Preparation Example XXVI, except add $Ti[OCH(CH_3)_2]_4$ to impart 5.0 atom % of Ti to the precipitate and thus yield a final Ni(1 wt. %)/$Cd_{47.50}Zn_{47.50}Ti_{5..0}S$ photocatalyst.

PREPARATION EXAMPLE XXIX

Repeat the procedure of Preparation Example I, except substitute $MnF_3$ for $MoCl_5$ as a promoter and thus to yield a final Ni(1 wt. %)/$Cd_{49.70}Zn_{49.70}Mn_{0.6}S$ photocatalyst.

PREPARATION EXAMPLE XXX

Repeat the procedure of Preparation Example XXIX, except add $MnF_3$ as a promoter to impart 0.2 atom % of Mn to the precipitate and thus to yield a final Ni(1 wt. %)/$Cd_{49.90}Zn_{49.90}Mn_{0.2}S$ photocatalyst.

PREPARATION EXAMPLE XXXI

Repeat the procedure of Preparation Example I, except substitute $H_3PO_2$ for $MoCl_5$ as a promoter thus to yield a final Ni(1 wt. %)/$Cd_{47.00}Zn_{47.00}P_{6.0}S$ photocatalyst.

PREPARATION EXAMPLE XXXII

Repeat the procedure of Preparation Example III, except add $RuCl_3 3H_2O$ instead of $NiCl_2 6H_2O$ to impart 1.0% by weight of Ru to the precipitate and thus to yield a final Ru(1 wt. %)/$Cd_{47.00}Zn_{47.00}P_{6.0}S$ photocatalyst.

PREPARATION EXAMPLE XXXIII

Repeat the procedure of Preparation Example XXXI except add $H_3PO_2$ as a promoter to impart 10.0 atom % of P to the precipitate and thus yield a final Ni(1 wt. %)/$Cd_{45.00}Zn_{45.00}P_{10.00}S$ photocatalyst.

PREPARATION EXAMPLE XXXIV

Repeat the procedure of Preparation Example I, except substitute $FeCl_3$ for $MoCl_5$ as a promoter, to yield a final Ni(1 wt. %)/$Cd_{49.70}Zn_{49.70}Fe_{0.6}S$ photocatalyst.

PREPARATION EXAMPLE XXXV

Repeat the procedure of Preparation Example I, except substitute $Pd(NO_3)_2$ for $MoCl_5$, as a promoter, to yield a final Ni(1 wt. %)/$Cd_{49.70}Zn_{49.70}Pd_{0.6}S$ photocatalyst.

PREPARATION EXAMPLE XXXVI

Repeat the procedure of Preparation Example I, except substitute $H_2PtCl_6$ for $MoCl_5$ as a promoter, to yield a final Ni(1 wt. %)/$Cd_{49.70}Zn_{49.70}Pt_{\cdot 0.6}S$ photocatalyst.

PREPARATION EXAMPLE XXXVII

Repeat the procedure of Preparation Example I, except substitute $Cu(NO_3)_2 3H_2O$ for $MoCl_5$, as a promoter, to yield a final Ni(1 wt. %)/$Cd_{49.70}Zn_{49.70}Cu_{0.6}S$ photocatalyst.

PREPARATION EXAMPLE XXXVIII

Repeat the procedure of Preparation Example I, except substitute $AgNO_3$ for $MoCl_5$, as a promoter, to yield a final Ni(1 wt. %)/$Cd_{49.70}Zn_{49.70}Ag_{0.6}S$ photocatalyst.

PREPARATION EXAMPLE XXXIX

Repeat the procedure of Preparation Example I, except substitute $IrCl_3$ for $MoCl_5$, as a promoter, to yield a final Ni(1 wt. %)/$Cd_{49.70}Zn_{49.70}Ir_{0.6}S$ photocatalyst.

PREPARATION EXAMPLE XL

Repeat the procedure of Preparation Example I, except substitute $Pb(NO_3)_2$ for $MoCl_5$, as a promoter, to yield a final Ni(1 wt. %)/$Cd_{49.70}Zn_{49.70}Pb_{0.6}S$ photocatalyst.

PREPARATION EXAMPLE XLI

Repeat the procedure of Preparation Example I, except substitute $SnCl_2$ for $MoCl_5$, as a promoter, to yield a final $Ni(1\ wt.\ \%)/Cd_{49.70}Zn_{49.70}Sn_{0.6}S$ photocatalyst.

PREPARATION EXAMPLE XLII

Repeat the procedure of Preparation Example I, except substitute $Ga(NO_3)_3$ for $MoCl_5$, as a promoter, to yield a final $Ni(1\ wt.\ \%)/Cd_{49.70}Zn_{49.70}Ga_{0.6}S$ photocatalyst.

PREPARATION EXAMPLE XLIII

Repeat the procedure of Preparation Example I, except substitute $ReCl_3$ for $MoCl_5$, as a promoter, to yield a final $Ni(1\ wt.\ \%)/Cd_{49.70}Zn_{49.70}Re_{0.6}S$ photocatalyst.

PREPARATION EXAMPLE XLIV

Repeat the procedure of Preparation Example I, except substitute $SbCl_3$ for $MoCl_5$, as a promoter, to yield a final $Ni(1\ wt.\ \%)/Cd_{49.70}Zn_{49.70}Sb_{0.6}S$ photocatalyst.

PREPARATION EXAMPLE XLV

Repeat the procedure of Preparation Example I, except add $K_2Cr_2O_7$ as a promoter to impart 0.2 atom % of Cr to the precipitate and thus to yield a final $Ni(1\ wt.\ \%)/Cd_{49.90}Zn_{49.90}Cr_{0.2}S$ photocatalyst.

PREPARATION EXAMPLE XLVI

Repeat the procedure of Preparation Example XLV, except add Cd and Zn to impart 39.90 atom % of Cd and 59.90 atom % of Zn, respectively, to the precipitate and thus to yield a final $Ni(1\ wt.\ \%)/Cd_{39.90}Zn_{59.90}Cr_{0.2}S$ photocatalyst.

PREPARATION EXAMPLE XLVII

Repeat the procedure of Preparation Example XLV, except add Cd and Zn to impart 59.90 atom % of Cd and 39.90 atom % of Zn, respectively, to the precipitate and thus to yield a final $Ni(1\ wt.\ \%)/Cd_{59.90}Zn_{39.90}Cr_{0.2}S$ photocatalyst.

PREPARATION EXAMPLE XLVIII

Repeat the procedure of Preparation Example XLV, except add $K_2Cr_2O_7$ as a promoter to impart 0.5 atom % of Cr to the precipitate and thus to yield a final $Ni(1\ wt.\ \%)/Cd_{49.75}Zn_{49.75}Cr_{0.5}S$ photocatalyst.

PREPARATION EXAMPLE XLIX

Repeat the procedure of Preparation Example XLV, except add $K_2Cr_2O_7$ as a promoter to impart 1.0 atom % of Cr to the precipitate and thus to yield a final $Ni(1\ wt.\ \%)/Cd_{49.50}Zn_{49.50}Cr_{1.0}S$ photocatalyst.

PREPARATION EXAMPLE L

Repeat the procedure of Preparation Example XLV to yield a final $Ni(1\ wt.\ \%)\ /Cd_{49.90}\ Zn49.90Cr_{0.2}S$ photocatalyst.

PREPARATION EXAMPLE LI

Repeat the procedure of Preparation Example III to yield a final $Ni(1\ wt.\ \%)\ /Cd_{49.00}\ Zn_{49.00}Mo_{2.0}S$ photocatalyst.

Comparative Preparation Example I

Repeat the procedure of Preparation Example XL, except impart 0.05% by weight of Ni, to yield a final $Ni(0.05wt.\%)/Cd_{49.70}Zn_{49.70}Pb_{0.6}S$ photocatalyst.

Comparative Preparation Example II

Repeat the procedure of Preparation Example XL, except impart 7.0% by weight of Ni, to yield a final $Ni(7.0wt.\%)/Cd_{49.70}Zn_{49.70}Pb_{0.6}S$ photocatalyst.

Comparative Preparative Example III

Repeat the procedure of Preparation Example XLV, except impart 91.80 atom % of Cd and 8.00 atom % of Zn, to yield a final $Ni(1\ wt.\ \%)/Cd_{91.80}Zn_{8.00}Cr_{0.2}S$ photocatalyst.

Comparative Preparation Example IV

Repeat the procedure of Preparation Example XLV, except impart 8.00 atom % of Cd and 91.80 atom % of Zn, to yield a final $Ni(1\ wt.\ \%)/Cd_{8.00}Zn_{91.80}Cr_{0.2}S$ photocatalyst.

Comparative Preparation Example V

Repeat the procedure of Preparation Example XLVIII, except reduction sintering for 30 minutes at a temperature of 380° C. after oxidation sintering, thus to yield a final $Ni(1\ wt.\ \%)/Cd_{49.75}Zn_{49.75}Cr_{0.5}S$ photocatalyst.

EXAMPLE I TO XLIX

Comparative Example I to V

Suspend 0.5 g of the photocatalyst, obtained in accordance with each of Preparation Examples I to XXIII and Comparative Preparation Example I to V, independently, in 500 ml of water which contains 0.36M of $Na_2S$ and 0.36M of $Na_2SO_3$ and stir the resulting suspension at a speed of 300 rpm in a photo reactor of a closed gas circulation system. Illuminate the resulting suspension with visible light (500 W Xe lamp with an optical filter which passes light with a wave length over 400 mm, with a distance of 4 cm from the light source) at room temperature and at 1 atm. On analysis by gas chromatography and Burette the amounts of produced hydrogen thus obtained are reflected in Table I below.

EXAMPLE L

Repeat the procedure of Example I, except substitute a 450 W high pressure mercury lamp for a 500 W Xe lamp, and thus obtained result is reflected in Table I below.

EXAMPLE LI

The lifetime of photocatalyst obtained in accordance with Preparation Example III were measured as follows. Suspend 0.5 g of photocatalyst obtained in accordance with Preparation Example III in 500 ml of water which contains 0.36 mol/liter of $Na_2S$ and 0.36 mol/liter of $Na_2SO_3$ and thereafter add a further 0.36 mol/liter of $Na_2S$ and 0.36 mol/liter of $Na_2SO_3$ into the above solution each subsequent period of 10 hours for total 100 hours, and measure the amount of produced hydrogen. As a result, the average amount of produced hydrogen gas during said procedure is 980 mL/hr, which is similar to the result (972 mL/hr) of Example XVII. Thus, the result of this procedure establishes that the lifetime of said photocatalyst is semi-infinite.

TABLE 1

| Exam. No. | Photocatalysts | Amount of Gas(mL/hr) | Remarks |
|---|---|---|---|
| I | Ni(1 wt. %)/$Cd_{49.70}Zn_{49.70}Mo_{0.6}S$ | 828 | |
| II | Ni(1 wt. %)/$Cd_{49.50}Zn_{49.50}Mo_{1.0}S$ | 940 | |
| III | Ni(1 wt. %)/$Cd_{49.00}Zn_{49.00}Mo_{2.0}S$ | 980 | |
| IV | Ni(1 wt. %)/$Cd_{49.00}Zn_{49.00}Mo_{2.0}S$ | 894 | $Na_2S:Na_2SO_3$ = 0.36 M:0.50 M |
| V | Ni(1 wt. %)/$Cd_{49.00}Zn_{49.00}Mo_{2.0}S$ | 930 | $Na_2S:Na_2SO_3$ = 0.50 M:0.36 M |
| VI | Ni(1 wt. %)/$Cd_{49.00}Zn_{49.00}Mo_{2.0}S$ | 678 | $Na_2S:Na_2SO_3$ = 0.25 M:0.25 M |
| VII | Ni(1 wt. %)/$Cd_{49.00}Zn_{49.00}Mo_{2.0}S$ | 1,011 | $Na_2S:Na_2SO_3$ = 0.50 M:0.50 M |
| VIII | Ni(1 wt. %)/$Cd_{48.50}Zn_{48.50}Mo_{3.0}S$ | 936 | |
| IX | Pt(1 wt. %)/$Cd_{49.00}Zn_{49.00}Mo_{2.0}S$ | 318 | uv doping |
| X | Ni(1 wt. %)/$Cd_{49.70}Zn_{49.70}V_{0.6}S$ | 525 | Oxidation sintering(4 hr.) |
| XI | Ni(1 wt. %)/$Cd_{49.50}Zn_{49.50}V_{1.0}S$ | 485 | Oxidation sintering(4 hr.) |
| XII | Ni(1 wt. %)/$Cd_{49.00}Zn_{49.00}V_{2.0}S$ | 462 | |
| XIII | Ni(1 wt. %)/$Cd_{49.00}Zn_{49.00}V_{2.0}S$ | 371 | Oxidation sintering(2 hr.) |
| XIV | Ni(1 wt. %)/$Cd_{49.00}Zn_{49.00}V_{2.0}S$ | 618 | Oxidation sintering(4 hr.) |
| XV | Ni(1 wt. %)/$Cd_{49.00}Zn_{49.00}V_{2.0}S$ | 422 | Oxidation sintering(6 hr.) |
| XVI | Ni(1 wt. %)/$Cd_{48.50}Zn_{48.50}V_{3.0}S$ | 571 | Oxidation sintering(4 hr.) |
| XVII | Ni(1 wt. %)/$Cd_{47.50}Zn_{47.50}V_{5.0}S$ | 522 | Oxidation sintering(4 hr.) |
| XVIII | Ni(1 wt. %)/$Cd_{49.70}Zn_{49.70}Co_{0.6}S$ | 750 | |
| XIX | Ni(1 wt. %)/$Cd_{49.00}Zn_{49.00}Co_{2.0}S$ | 600 | |
| XX | Ni(1 wt. %)/$Cd_{47.50}Zn_{47.50}Co_{5.0}S$ | 588 | |
| XXI | Ni(1 wt. %)/$Cd_{49.70}Zn_{49.70}Al_{0.6}S$ | 804 | |
| XXII | Ni(1 wt. %)/$Cd_{49.00}Zn_{49.00}Al_{2.0}S$ | 681 | |
| XXIII | Ni(1 wt. %)/$Cd_{47.50}Zn_{47.50}Al_{5.0}S$ | 663 | |
| XXIV | Ni(1 wt. %)/$Cd_{49.70}Zn_{49.70}Cs_{0.6}S$ | 750 | |
| XXV | Ni(1 wt. %)/$Cd_{49.00}Zn_{49.00}Cs_{2.0}S$ | 549 | |
| XXVI | Ni(1 wt. %)/$Cd_{49.70}Zn_{49.70}Ti_{0.6}S$ | 702 | |
| XXVII | Ni(1 wt. %)/$Cd_{49.00}Zn_{49.00}Ti_{2.0}S$ | 624 | |
| XXVIII | Ni(1 wt. %)/$Cd_{47.50}Zn_{47.50}Ti_{5.0}S$ | 501 | |
| XXIX | Ni(1 wt. %)/$Cd_{49.70}Zn_{49.70}Mn_{0.6}S$ | 270 | |
| XXX | Ni(1 wt. %)/$Cd_{49.90}Zn_{49.90}Mn_{0.2}S$ | 160 | |
| XXXI | Ni(1 wt. %)/$Cd_{47.00}Zn_{47.00}P_{6.0}S$ | 429 | |
| XXXII | Ru(1 wt. %)/$Cd_{47.00}Zn_{47.00}P_{6.0}S$ | 168 | |
| XXXIII | Ni(1 wt. %)/$Cd_{45.00}Zn_{45.00}P_{10.0}S$ | 376 | |
| XXXIV | Ni(1 wt. %)/$Cd_{49.70}Zn_{49.70}Fe_{0.6}S$ | 642 | |
| XXXV | Ni(1 wt. %)/$Cd_{49.70}Zn_{49.70}Pd_{0.6}S$ | 630 | |
| XXXVI | Ni(1 wt. %)/$Cd_{49.70}Zn_{49.70}Pt_{0.6}S$ | 531 | |
| XXXVII | Ni(1 wt. %)/$Cd_{49.70}Zn_{49.70}Cu_{0.6}S$ | 201 | |
| XXXVIII | Ni(1 wt. %)/$Cd_{49.70}Zn_{49.70}Ag_{0.6}S$ | 420 | |
| XXXIX | Ni(1 wt. %)/$Cd_{49.70}Zn_{49.70}Ir_{0.6}S$ | 397 | |
| XL | Ni(1 wt. %)/$Cd_{49.70}Zn_{49.70}Pb_{0.6}S$ | 366 | |
| C.I | Ni(0.05 wt. %)/$Cd_{49.70}Zn_{49.70}Pb_{0.6}S$ | 79 | |
| C.II | Ni(7 wt. %)/$Cd_{49.70}Zn_{49.70}Pb_{0.6}S$ | 69 | |
| XLI | Ni(1 wt. %)/$Cd_{49.70}Zn_{49.70}Sn_{0.6}S$ | 426 | |
| XLII | Ni(1 wt. %)/$Cd_{49.70}Zn_{49.70}Ga_{0.6}S$ | 627 | |
| XLIII | Ni(1 wt. %)/$Cd_{49.70}Zn_{49.70}Re_{0.6}S$ | 639 | |
| XLIV | Ni(1 wt. %)/$Cd_{49.70}Zn_{49.70}Sb_{0.6}S$ | 642 | |
| XLV | Ni(1 wt. %)/$Cd_{49.90}Zn_{49.90}Cr_{0.2}S$ | 582 | |
| XLVI | Ni(1 wt. %)/$Cd_{39.90}Zn_{59.90}Cr_{0.2}S$ | 302 | |
| XLVII | Ni(1 wt. %)/$Cd_{59.90}Zn_{39.90}Cr_{0.2}S$ | 368 | |
| C.III | Ni(1 wt. %)/$Cd_{91.80}Zn_{8.00}Cr_{0.2}S$ | 78 | |
| C.IV | Ni(1 wt. %)/$Cd_{8.00}Zn_{91.80}Cr_{0.2}S$ | 67 | |
| XLVIII | Ni(1 wt. %)/$Cd_{49.75}Zn_{49.75}Cr_{0.5}S$ | 440 | |
| C.V | Ni(1 wt. %)/$Cd_{49.75}Zn_{49.75}Cr_{0.5}S$ | 50 | Oxidation sintering(0.5 hr) |
| XLIX | Ni(1 wt. %)/$Cd_{49.50}Zn_{49.50}Cr_{1.0}S$ | 382 | |
| L | Ni(1 wt. %)/$Cd_{49.90}Zn_{49.90}Cr_{0.2}S$ | 909 | uv |
| LI | Ni(1 wt. %)/$Cd_{49.00}Zn_{49.00}Mo_{2.0}S$ | 972 | |

Industrial Applicability

As apparent from the data, the CdZnMS photocatalyst in accordance with the present invention includes both CdS group of photocatalyst having a property of high catalytic activity to a visible light and ZnS group of photocatalyst having a relatively advantage of high activity to a uv light and thus said photocatalyst can be used to wider range of light source than photocatalysts of prior art.

Furthermore, by introducing following techniques such as additon of other novel doping metals and various promotors, development of novel adding technique and establishment of optimal sintering period, present invention overcomes a difficulty of previous restricted activity of photocatalysts to the added reductants in the reaction.

In addition, said photocatalysts are also superior in life expectancy as well as hydrogen production yield due to the optimal composition of Cd/Zn and reaction condition.

The invention and its advantages are readily understood from the foregoing description. It is apparent that various changes may be made in the processes and compositions without departing from the spirit and scope of the invention or sacrificing its material advantages. The processes and compositions hereinbefore described are merely illustrative of preferred embodiments of the invention.

What is claimed is:

1. A CdZnMS photocatalyst for the production of hydrogen, represented by the following formula VII:

$$m(a)/Cd_xZn_yM_zS \quad (VII)$$

wherein 'm' represents a doped metal element as an electron acceptor selected from the group consisting of Ni, Pt, Ru and the oxides of these metals;

'a' represents a percentage by weight of m, ranging from 0.10 to 5.00;

'M' is a catalyst element selected from the group consisting of Mo, V, Al, Cs, Mn, Fe, Pd, Pt, P, Cu, Ag, Ir, Sb, Pb, Ga and Re;

'x' represents an atom % of Cd/(Cd+Zn+M), ranging from 10.0 to 90.00;

'y' represents an atom % of Zn/(Cd+Zn+M), ranging from 10.0 to 90.00; and

'z' represents an atom % of M/(Cd+Zn+M), ranging from 0.05 to 20.00, respectively.

2. A method for preparing a CdZnMS photocatalyst as claimed in claim 1, comprising the steps of: dissolving Cd-containing, Zn-containing and M-containing compounds in water in such an amount that an atom % of M/(Cd+Zn+M) ranges from 0.05 to 20.00 and an atom % of Cd/(Cd+Zn+M) and an atom % of Zn/(Cd+Zn+M) range from 10.00 to 90.00, respectively; adding $H_2S$ or $Na_2S$ as a reactant in said solution with stirring to precipitate $Cd_xZn_yM_zS$; washing the precipitate with water and vacuum drying the precipitate in a nitrogen atmosphere and in a temperature range from 105 to 150 °C. for 1.5 to 3.0 hours; doping the thus-dried precipitate by adding a liquid m-containing compound thereto in an amount of 0.10 to 5.00% by weight.

3. A method for preparing a CdZnMS photocatalyst in accordance with claim 2, in which said doping includes oxidation sintering and reduction sintering in a temperature range from 300 to 400° C. after uv illumination in a nitrogen atmosphere when 'm' is platinum(Pt).

4. A method for preparing a CdZnMS photocatalyst in accordance with claim 2, wherein said m-containing compound comprises a member selected from the group consisting of $H_2PtCl_6$, $RuCl_3$, $NiSO_4$, $Ni(NO_3)_2$, $Ni(CH_3CO_2)_2$, $NiCl_2$, $NiBr_2$ and $NiI_2$.

5. A method for preparing a CdZnMS photocatalyst in accordance with claim 2, wherein the Cd-containing compound comprises a member selected from the group consisting of $CdCl_2$, $CdBr_2$, $CdI_2$, $Cd(CH_3CO_2)_2$ $xH_2O$, $CdSO_4xH_2O$ and $Cd(NO_3)_24H_2O$ and the Zn-containing compound comprises a member selected from the group consisting of $ZnCl_2$, $ZnBr_2$, $ZnI_2$, $Zn(CH_3CO_2)_2$ $xH_2O$, $ZnSO_4$ $xH_2O$ and $Zn(NO_3)_2$ $xH_2O$.

6. A method for preparing a CdZnMS photocatalyst in accordance with claim 2, which includes treating with hydrochloric acid and ultra sonication before vacuum drying when 'm' is not platinum.

7. A method for producing hydrogen with said CdZnMS photocatalyst, comprising the steps of: irradiating with visible light adjusted by a light filter or with uv an aqueous suspension of said photocatalyst in claim 1, while stirring, the aqueous suspension comprising 0.05 to 1.00 mol/liter of $Na_2S$ as an electron donor and 0.05 to 1.00 mol/liter of $Na_2SO_3$ as a reducing agent.

8. A method for producing hydrogen with said CdZnMS photocatalyst in accordance with claim 7, wherein a reaction condition where the temperature range is 10 to 60° C. and the pressure is vacuum to 2 atm.

* * * * *